United States Patent
Borodani et al.

(10) Patent No.: US 6,253,139 B1
(45) Date of Patent: Jun. 26, 2001

(54) SYSTEM FOR THE PERSONALIZED AUTOMATIC CONTROL OF GEAR CHANGES IN A MOTOR VEHICLE PROVIDED WITH SERVO-ASSISTED GEARS

(75) Inventors: Pandeli Borodani, Turin; Massimo Lupo, Rivalta; Renato Gianoglio, Turin; Fulvio Giuliano, Vinovo, all of (IT)

(73) Assignee: C.R.F. Societa Corsortile per Azioni, Orbassano (IT)

( * ) Notice: Subject to any disclaimer, the term of this patent is extended or adjusted under 35 U.S.C. 154(b) by 0 days.

(21) Appl. No.: 09/301,369

(22) Filed: Apr. 16, 1999

(30) Foreign Application Priority Data

Apr. 16, 1998 (IT) ............................................. TO98A0325

(51) Int. Cl.[7] ................................................... G06F 15/20
(52) U.S. Cl. ................................. 701/55; 701/51; 701/56; 701/59
(58) Field of Search ................................. 701/51, 55, 56, 701/59, 61; 477/128, 43, 46, 49; 74/866

(56) References Cited

U.S. PATENT DOCUMENTS 5,396,420 * 3/1995 Graf ........................................ 701/55

* cited by examiner

Primary Examiner—William A. Cuchlinski, Jr.
Assistant Examiner—Arthur D. Donnelly
(74) Attorney, Agent, or Firm—Sughrue, Mion, Zinn, Macpeak & Seas, PLLC

(57) ABSTRACT

The system includes a memory in which curves are stored which define the conditions for each gear change, corresponding to at least two reference styles of driving, sensors for operating parameters of the motor vehicle, and second processing devices set up to estimate the value of a first index which identifies the kind of driving of the motor vehicle and, respectively, the value of a second index which defines the manner or style of driving of the driver, and a processing and control unit. This unit is set up to perform a learning procedure in which it acquires and memorizes the value of the second index corresponding to the manner or style of driving of the driver during a test drive with manual control of the gears, and generates and memorizes maps of modified curves defining the conditions for the gear changes according to a personalized style of driving from among the said reference methods, and an automatic control procedure in which it controls actuators in order automatically to effect the gear changes based on the modified curves generated during the learning procedure.

8 Claims, 3 Drawing Sheets

SYSTEM FOR THE PERSONALIZED AUTOMATIC CONTROL OF GEAR CHANGES IN A MOTOR VEHICLE PROVIDED WITH SERVO-ASSISTED GEARS

The present description concerns a system for controlling the gear changes in a motor vehicle having an internal combustion engine with a manually controlled, servo-assisted discrete ratio gear mechanism and an automatic clutch, controlled by first and, respectively, second actuator means under electrical control.

Motor vehicles have been developed relatively recently which have discrete ratio gears (like conventional gears) with servo-assisted manual control. In these motor vehicles, changing gear is controlled manually by the driver who operates members suitable for this purpose such as a lever or push button or similar in association with which are sensors that provide a control unit with information on the gear change or ratio that the driver intends to effect. The control unit then drives suitable electrically controlled actuators associated with the gears to select the desired gear ratio. In some systems, engaging and releasing the clutch which controls the coupling of the engine to the transmission is automatically controlled by the unit controlling the servo-assisted gears, and the conventional pedal for controlling the gear is eliminated.

The object of the present invention is to provide a system for controlling gear changes in a motor vehicle provided with discrete ratio gears under servo-assisted manual control and an associated automatic clutch, which system enables the gear changes to be controlled completely automatically and in a personalised manner based on the driving habits of a particular user.

This and other objects are achieved according to the invention with a system the essential characteristics of which are defined in the accompanying claim 1.

Other specific characteristics of the system according to the invention are defined in the dependent claims.

Further characteristics and advantages of the invention will become clear from the following detailed description, given by way of non-limitative example and with reference to the accompanying drawings, in which.

Figure 1:
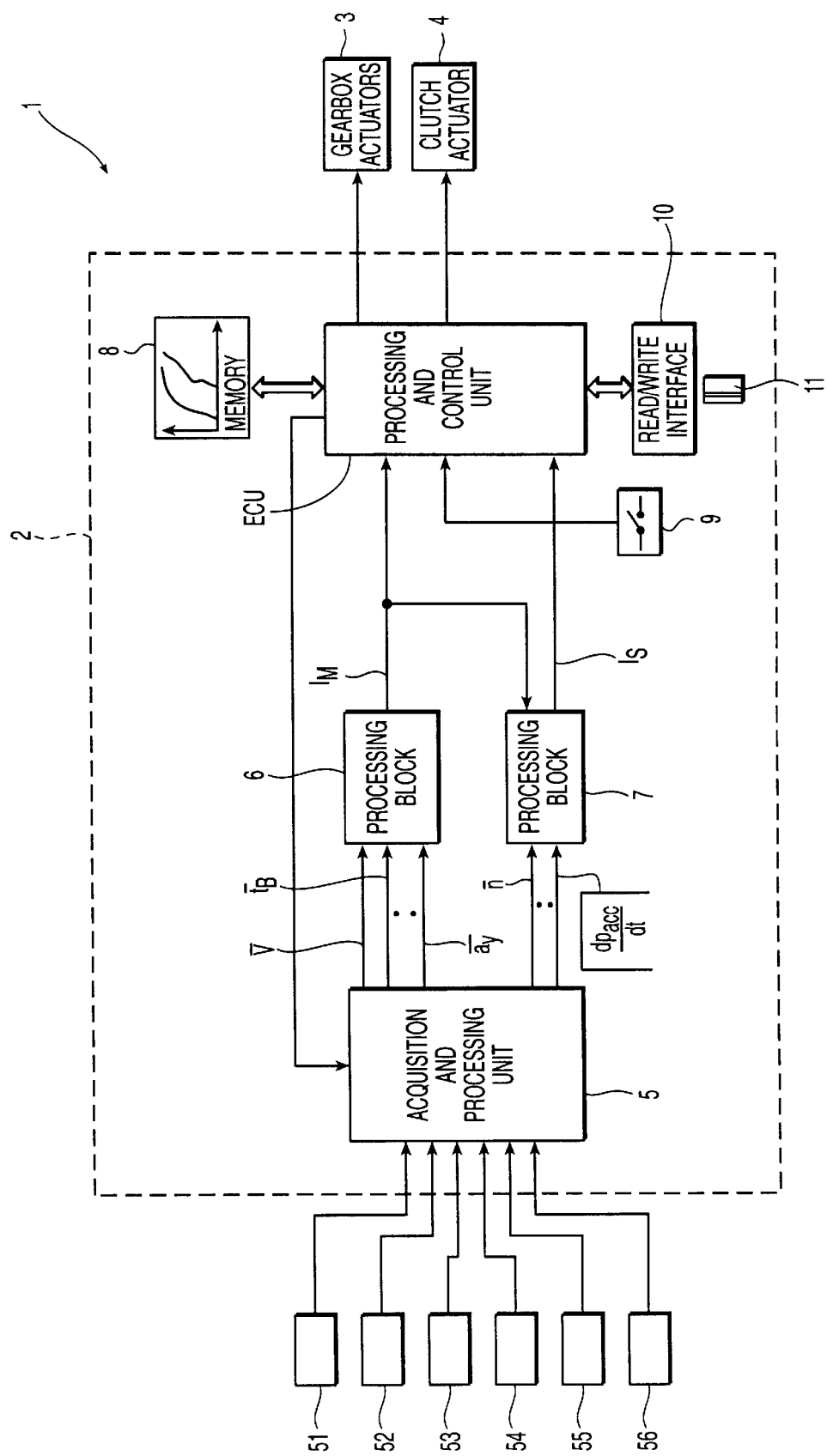
FIG. 1 is a block diagram of a control system according to the invention.

In FIG. 1, the reference numeral 1 generally indicates a control system according to the invention. The system includes a plurality of electrical sensors S1–S6 connected to a processing and control section generally indicated 2.

This processing and control section 2 is connected to the actuators 3 of a discrete ratio gear mechanism having servo-assisted manual control, of a known type that is therefore not shown. The actuators 3 can be electromagnetic, electrohydraulic, electropneumatic or any other kind of actuator.

The processing and control section 2 of the control system 1 is also connected to a further electrically controlled actuator 4 associated with the clutch (not shown) which controls the coupling between the internal combustion engine and the transmission of the motor vehicle.

In a preferred, although not limiting, arrangement, the control system 1 has the following sensors:

a sensor S1 which provides signals indicating the speed of the vehicle;

a sensor S2 which provides signals having two states indicating whether the brakes of the motor vehicle are activated or not; the sensor S2 can be constituted by a simple switch associated with the brake control pedal;

a sensor S3 which provides electrical signals indicating the angle of rotation of the steering wheel or—alternatively—the transverse acceleration $a_y$ of the motor vehicle;

a sensor S4 which provides signals indicating the position of the accelerator pedal;

a sensor S5 which provides signals indicating the speed of rotation, or the number of revolutions of the internal combustion engine of the motor vehicle; and a sensor device S6 which provides electrical signals indicating the gear ratio selected by the driver via the manual control member or members of the servo-assisted gear change.

All of the sensors described above are known and will not therefore be described further.

The processing and control section 2 of the control system 1 includes a unit 5 for collecting and processing the output signals from the sensors S1–S6. This unit is set up in a known way to calculate, based on the information provided by the sensors, the value of certain quantities or parameters which are then used for the personalised automatic control of the servo-assisted gear change.

In a preferred, although not limiting, arrangement, the unit is set up to calculate the following quantities:

average speed $\overline{V}$ of the motor vehicle;

the average speed of rotation (the number of revolutions) $\overline{n}$ of the engine;

the average value of the modulus of the time derivative of the position of the accelerator pedal;

the average time $\overline{t}_b$ for which the brakes are operated per kilometer travelled by the motor vehicle;

the average transverse acceleration $\overline{a}_y$ of the motor vehicle;

the number of gear changes per kilometer travelled by the motor vehicle;

the number of times the brakes are operated per kilometer;

the maximum speed of the motor vehicle;

the average number of revolutions of the engine for each gear change;

the distance travelled by the motor vehicle.

The output of the collection and processing unit 5 is connected to two processing blocks 6 and 7 formed, for example, as "fuzzy" logic blocks.

The processing block 6 is arranged to determine, or rather to estimate, in a predetermined manner the value of a first predefined index $I_M$ which identifies the kind of driving or journey of the motor vehicle from among a plurality of kinds of defined journeys or trips. The type of driving or journey can be, for example, the following:

city driving;

hill/mountain driving;

out-of-town driving.

The processing block 6 determines the value of the index $I_M$ based on the value of the quantities or parameters provided by the collection and processing unit 5.

Figure 2:
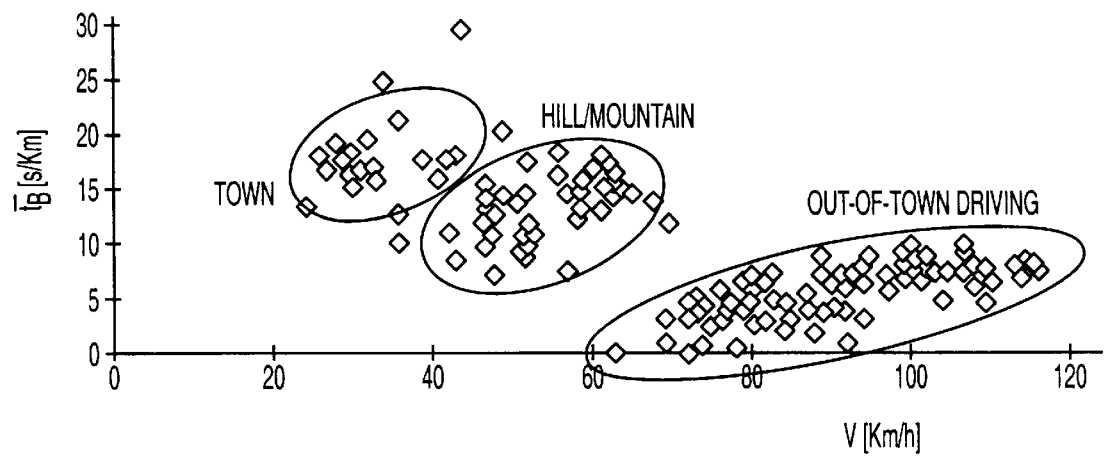
FIGS. 2 and 3 are two graphs that show the relationship between quantities or parameters controlled in the system according to the invention in order to identify the kind of driving or journey for which the motor vehicle is employed.

In a first arrangement, the processing block 6 is set up to determine the value of the index $I_M$ based on the average value $\overline{V}$ of the speed of the motor vehicle and the average brake-operating time $\overline{t}_b$. FIG. 2 shows a graph which, in the plane $t_B$, V shows three "clouds" of points obtained experimentally with a given motor vehicle during test drives in the city, in the hills/mountains and, respectively, on out-of-town roads. It can be seen that the three clouds of points are fairly clearly separated so that based on the information of the average speed $\overline{V}$ of the motor vehicle and the average brake-operating time $\overline{t}_B$ of the motor vehicle, it is easy to determine the kind of driving of the motor vehicle at any one time.

Figure 3:
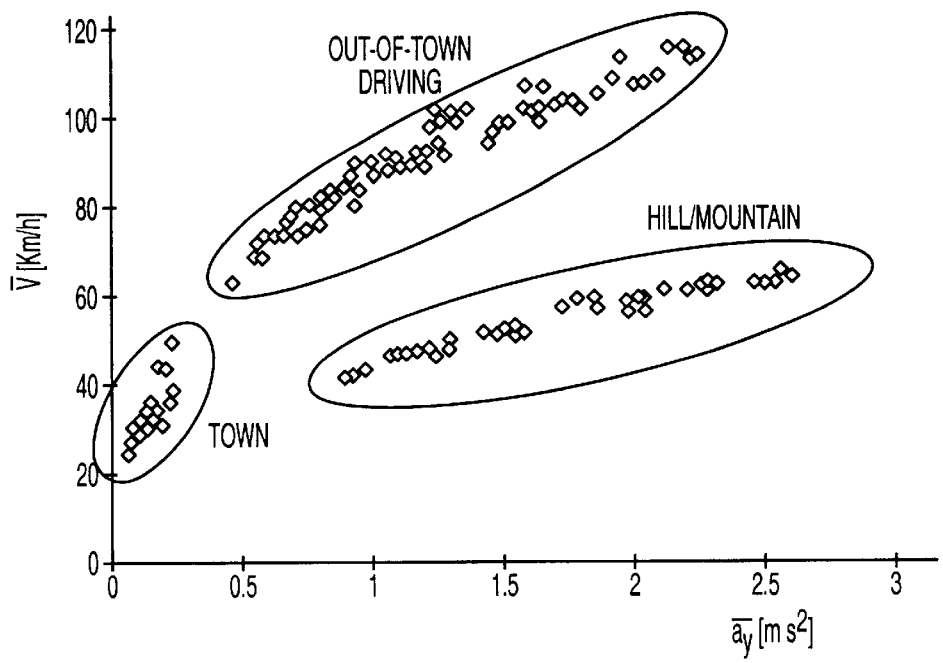

FIG. 3 is a diagram similar to FIG. 2, and shows, in the plane $\overline{V}$ (the average speed of the motor vehicle), $\overline{\alpha}_y$ (the average transverse acceleration of the motor vehicle), the values detected for a motor vehicle during test drives in the city, in the hills/mountains and on out-of-town roads. The separation of the "clouds" of points for the three kinds of driving is, in the case of FIG. 3, even clearer than in the graph of FIG. 2.

Therefore, in a second arrangement, the processing block 6 can be set up to detect the style of driving of the motor vehicle based on the analysis of the average values of the speed and transverse acceleration of the motor vehicle.

The two ways of detecting the kind of driving of the motor vehicle can be integrated or combined with each other for a more precise and reliable determination.

Therefore, in order to recognise the kind of driving of the motor vehicle, further parameters can be monitored and evaluated in addition to those principal parameters described above.

The processing block 6 is set up to generate a signal indicating the value of the index $I_M$ which takes different values depending on the kind of driving or journey of the motor vehicle.

The output of the processing block 6 is connected to an input of the processing block 7 and to an input of a processing and control unit ECU.

The processing block 7 receives signals/information from the collection and processing unit 5 which indicates several quantities and/or parameters, on the basis of which the block calculates or estimates in a predetermined way the value of a second index $I_S$ which determines the manner or style of driving of the driver from among a plurality of a predefined manners or styles.

The different driving manners or styles of a driver can be defined, for example, from the correlation between the average values of the number of revolutions n of the vehicle engine and the modulus or absolute value of the time derivative of the position of the accelerator pedal (or any other equivalent quantity that indicates the torque demanded by the driver). Depending on the average values of the said quantities and the corresponding value of the index $I_M$, a plurality of manners or styles of driving can be distinguished, such as "economic" driving with low fuel consumption, "sporty" driving requiring high velocity/acceleration of the motor vehicle, and one or more intermediate manners or styles of driving.

The processing block 7 outputs a signal indicating the value of the index $I_S$ calculated according to predetermined criteria based on the values of the monitored parameters. In relation to these latter, it is also worth observing that in addition to the parameters discussed, further parameters can be monitored and evaluated for a more precise determination of the manner or style of driving.

A memory 8 is connected to the processing and control unit ECU, which memory stores data characterising curves which define the conditions for the gear changes corresponding to at least two reference driving styles.

Figure 4:
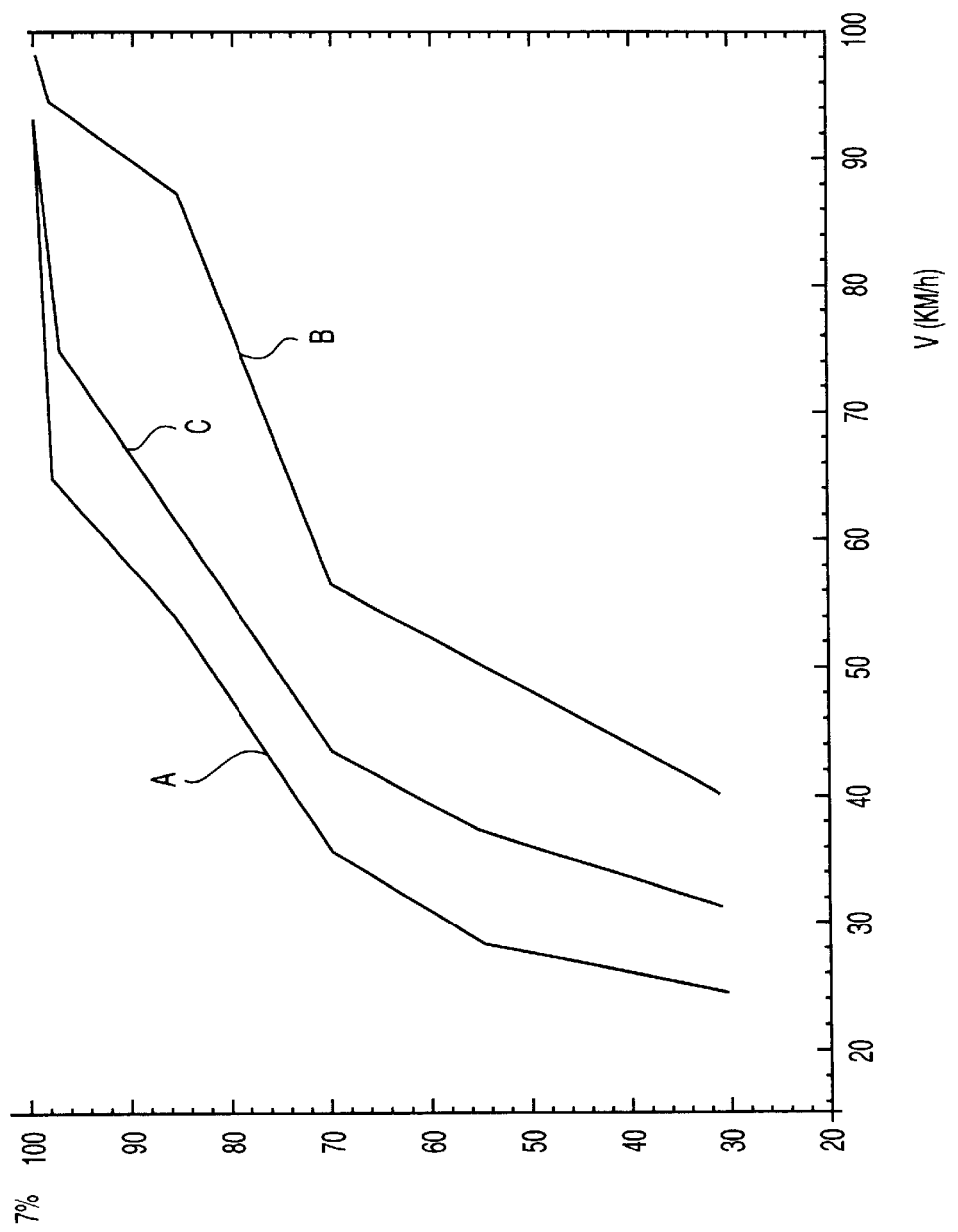
FIG. 4 is a graph that shows the shape of the curve defining the conditions for changing gear according to different styles of driving.

By way of example, FIG. 4 illustrates curves A and B which, in the plane T% (torque delivered by the engine, as a percentage), V (the speed of the motor vehicle), define the conditions for the change from second to third gear according to a manner of driving intended to minimise fuel consumption (curve A) and, respectively, a manner of driving intended to obtain the maximum possible performance (curve B). Corresponding reference curves A and B for all possible gear changes are stored in the memory 8.

Further intermediate curves between the curves A and B can also be "mapped" for each gear change in the memory 8, corresponding to other predetermined reference manners of driving.

The output of the processing and control unit ECU is connected to the actuators 3 associated with the gear mechanism and the actuator 4 associated with the clutch.

The unit ECU is predetermined selectively to activate a learning procedure and an automatic control procedure.

The learning procedure can be activated, for example, by means of a selector 9 connected to the unit ECU.

In the learning procedure, the processing and control unit ECU activates the collection and processing unit 5 and the associated processing blocks 6 and 7, and collects and stores the value of the index $I_S$ indicating the manner or style of driving of the driver during a test drive in which the gear changes are manually controlled by the driver. Once the value of the style index $I_S$ has been acquired, the processing and control unit ECU generates during the learning procedure, using a predetermined method of interpolation and depending on the acquired value of the index $I_S$, maps of modified curves, defining the conditions for activating the gear changes for a personalised driving style somewhere between the reference styles corresponding to the curves A and B stored in the memory 8.

By way of example, on the basis of a given value for the index $I_S$, for the change from second to third gear the unit ECU defines a modified ("personalised") curve indicated C in FIG. 4, by interpolating from the curves A and B of the same Figure.

The modified curves C defining the conditions for the gear changes according to the personalised driving style are stored so that they can be used on subsequent occasions when the automatic control procedure is activated.

In the automatic control procedure, the unit ECU controls the actuators 3 and 4 to change gear automatically based on the modified curves C generated during the learning procedure.

When the system 1 operates in the automatic control mode, the driver of the motor vehicle no longer operates the lever or other manual control member for changing gear, the gear changes being controlled completely automatically by the unit ECU of the system, as described above.

Advantageously, although not necessarily, during the automatic control procedure the unit ECU can correct or alter the modified curves C generated during the learning stage, such alterations being based on the currently estimated value of the index $I_M$ which indicates the style of driving of the motor vehicle at that moment.

A writing/reading interface unit 10 can advantageously be connected to the processing and control unit ECU, which unit 10 writes to a non-volatile portable memory support 11, such as a magnetic card, data identifying the personalised style of driving defined during the aforesaid learning procedure, this identification data subsequently being loaded from the memory support 11 in order to activate the personalised style of driving during the automatic control procedure.

The system can be set up to enable the writing/reading to/from the memory support 11 of identification data for a plurality of personalised driving styles defined during various learning procedures conducted while the motor vehicle is driven by a different driver, for example, a different person in the family or anyone else likely to use the motor vehicle.

Naturally, with the principle of the invention remaining the same, the embodiments and details of manufacture can be widely varied with respect to that described and illustrated purely by way of non-limitative example, without by this departing from the ambit of the invention as defined in the accompanying claims.

What is claimed is:

1. A system for controlling gear changes in a motor vehicle provided with an internal combustion engine and having a discrete ratio gear under servo-assisted manual control and an automatic clutch, respectively controlled by first and second electrically controlled actuator means;

the system including:

memory means in which curves are mapped corresponding to at least two reference styles of driving, which curves define the conditions for each gear change;

a plurality of sensors which provide electrical signals indicating the values or states of a plurality of operating parameters of the motor vehicle;

first processing means connected to at least some of the said sensors and set up to estimate according to predetermined methods the value of a first predefined index which identifies the kind of driving or journey of the motor vehicle from among a plurality of predefined kinds of journeys or trips;

second processing means connected to at least some of the said sensors and to the said first processing means and set up to estimate according to predetermined methods, depending on the signals emitted from the said sensors and the estimated value of the first index, the value of a second predefined index which identifies the manner or style of driving of the driver from among a plurality of predefined manners or styles; and a processing and control unit connected to the said first and second processing means to the said memory means and to the actuator means associated with the gears and the clutch; the processing and control unit being set up to perform:

a learning procedure in which by means of the first and second processing means, the value of the said second index corresponding to the manner or style of driving of the driver during a test drive with manual gear changing is acquired and stored, and using predefined methods of interpolation based on the said value of the second index, maps of modified curves are generated which define the conditions for the gear changes according to a personalised style of driving somewhere between the said reference styles, and the said maps of modified curves are stored; and an automatic control procedure in which the said first and second actuator means are controlled so as to effect automatically the gear changes based on the modified curves generated in the learning procedure.

2. A system according to claim 1, wherein during the said automatic control procedure the electronic processing and control unit is set up to control the gear changes based on the said modified curves which are altered depending on the estimated instantaneous value of the aforesaid first index.

3. A system according to claim 1, wherein the said sensors include a sensor for the speed of the motor vehicle, a sensor for detecting operation of the brakes of the motor vehicle, and wherein the said first processing means are set up to calculate, based on the signals provided by the sensors described above, the average value of the speed of the motor vehicle and the average value of the overall brake-operating time, and for estimating the value of the aforesaid first index together with the said average calculated values.

4. A method according to claim 1, wherein the said sensors include a sensor for detecting the speed of the motor vehicle and a sensor for detecting the angle of the steering wheel, connected to the said first processing means, which are set up to calculate the average values of the speed and the transverse acceleration of the motor vehicle, and to estimate the value of the aforesaid first index as a function of the said calculated average values.

5. A system according to claim 3 or claim 4, wherein the said sensors further include a sensor for the gear or ratio selected by the driver, and a sensor for detecting the speed of rotation of the engine of the motor vehicle, which are connected to the said second processing means which are set up to calculate the average value of the speed of rotation of the engine and the average value of the modulus of the time derivative of the speed of rotation of the engine, and estimate the value of the said second index based on the acquired value of the said first index, the said gears engaged by the driver, and the average value of the speed of rotation and the modulus of the derivative of the said speed of rotation of the engine.

6. A system according to claim 1, wherein at least first and second groups of curves are mapped in the aforesaid memory means, which curves define the conditions for effecting the gear changes according to first and, respectively, second reference styles of driving corresponding to low fuel consumption and, respectively, the maximum performance of the motor vehicle.

7. A system according to claim 1, wherein curves are stored in the said memory means which define the conditions for effecting the gear changes and which correlate the torque required by the engine as a function of the speed of the motor vehicle.

8. A system according to claim 1, further including an interface unit which transcribes onto a portable, nonvolatile memory support identification data of at least one personalised style of driving defined in the aforesaid learning procedure, and which acquires the said identification data from this memory support in order to effect the said personalised style of driving during the automatic control procedure.

* * * * *